United States Patent [19]

Mano

[11] Patent Number: 5,131,690
[45] Date of Patent: Jul. 21, 1992

[54] SELF-LOCKING CONNECTOR

[76] Inventor: Michael E. Mano, 18501 S. Dalton Ave., Gardena, Calif. 90248

[21] Appl. No.: 737,182

[22] Filed: Jul. 29, 1991

[51] Int. Cl.⁵ .................................................. F16L 15/00
[52] U.S. Cl. ........................................ 285/92; 285/89; 411/149
[58] Field of Search ................... 285/92, 89; 411/149, 411/150, 136, 137, 138

[56] References Cited

U.S. PATENT DOCUMENTS

| | | | |
|---|---|---|---|
| Re. 23,586 | 6/1947 | Merriman | 285/89 X |
| 1,691,599 | 10/1926 | Zimmermann | 285/92 X |
| 2,491,406 | 12/1945 | Zeeb | 285/89 |
| 3,971,614 | 7/1976 | Paoli et al. | 285/89 X |
| 4,993,755 | 2/1991 | Johnston | 285/92 X |

Primary Examiner—Randolph A. Reese
Assistant Examiner—Timothy Aberle

[57] ABSTRACT

A self-locking connector comprising first and second tubular fittings, the first fitting having an annular ramp and a threaded end adjacent to the ramp, and the second fitting having an annular shoulder adjacent to one of its ends. A nut is rotatably mounted on the second fitting and is threaded to the threaded end of the first fitting. The nut has a flanged end which is adapted to engage the shoulder on the second fitting to bring the two fittings into axially aligned mating and sealing relationship as the nut is tightened on the first fitting. A resilient collar is interposed between the ramp on the first fitting and the nut. The collar has longitudinal slots in the forward end thereof which engage the ramp in locking relationship as the nut is tightened onto the threaded end of the first fitting. The adjacent edges of the nut and of the collar have mating ramps, which each ramp having an angle greater than the helical angle of the threads of the first fitting and of the nut. When the nut is tightened, the ramps on the collar and on the nut mate with one another, and effectively lock the nut against rotation with respect to the first fitting.

9 Claims, 2 Drawing Sheets

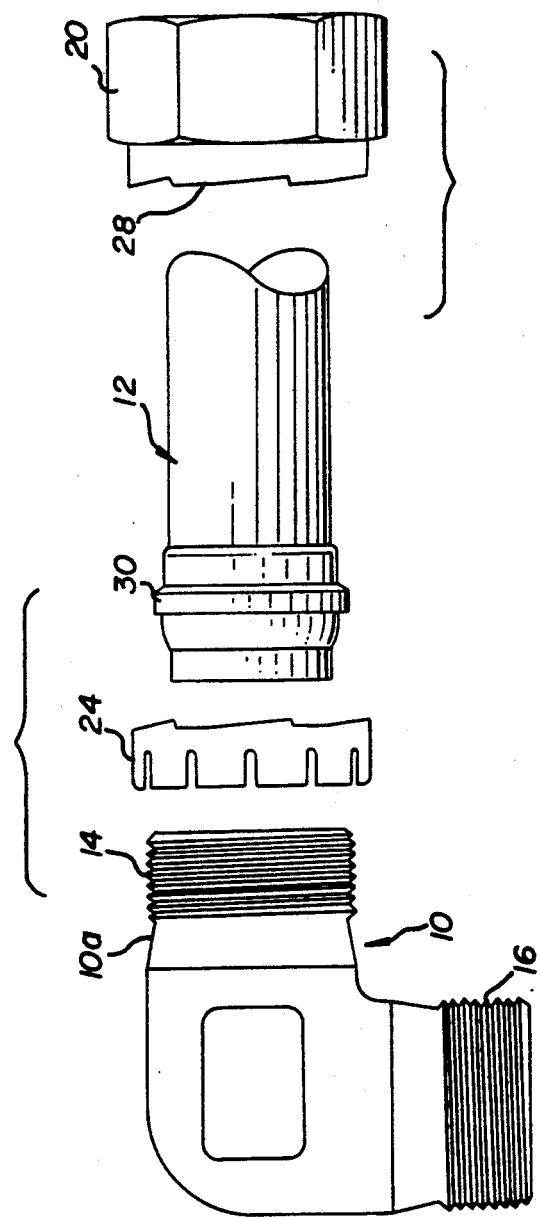

SELF-LOCKING CONNECTOR

BACKGROUND OF THE INVENTION

A simple self-locking connector is provided to interconnect the adjacent ends of tubular conduits, particularly in aircraft, and for holding the conduits coupled to one another in a fluid-type relationship in the presence of vibrations. It is well known that connectors used on aircraft are subject to vibrations so that they may loosen and allow leakage. Consequently, there is a tendency for mechanics to tighten such connectors excessively and thereby damage them.

Many connectors have been proposed in the past in attempts to assure that their mating parts will be locked together and cannot be accidentally loosened as a result of vibrations. One approach has been to attach keepers to the connector which use lock wires, cotter pins, keys, back-up nuts, lock washers, etc. Although such keepers have proven to be effective for some purposes, they require extra parts and additional assembly operations. Also, it is particularly difficult to install the keepers when the connector is in a location which is not readily accessible.

Co-pending application Ser. No. 07/674,455, filed Mar. 225, 1991, in the name of the present inventor provides a self-locking connector which overcomes the disadvantages described above. The connector described in the co-pending application is simple and economical in its construction, and it is capable of being reused a large number of times. The connector disclosed in the application is also rugged in its construction and reliable in its operation. Specifically the connector described in the co-pending application comprises first and second tubular fittings which are held together in axially aligned sealed relationship by a nut which is coaxially positioned with respect to the two fittings. The nut is rotatbly mounted on the second fitting and its forward end is threaded into a threaded end of the first fitting.

The nut of the Co-pending Application has an internal flange at its rear end which engages an annular shoulder on the second fitting. As the nut is tighten onto the threaded end of the first fitting, it draws the two fittings together so that an annular sealing surface on the second fitting is drawn into sealing relationship with an annular seat in the end of the first fitting. An external integral hexagonal shoulder is formed coaxially on the first fitting of the connector of the co-pending application, and a frusto-conical Belleville type resilient washer is interposed between the hexagonal shoulder and the forward end of the nut. As the nut is tightened, its forward end engages the Belleville washer and compresses it axially as the sealing surface of the second fitting seats into the seat in the first fitting. The Belleville washer is compressed between the hexagonal shoulder and the end of the nut, and due to its sprig effect it creates a high frictional resistance to backward rotation of the nut. The adjacent edges of the Belleville washer and the nut are configured to define mating ramps, each ramp having an inclination angle which is greater than the helical angle of the threads of the nut and of the threaded end of the first fitting, so that the nut is effectively locked on the first fitting.

The connector of the present invention is similar in many respects to the connector of the co-pending application, and it incorporates all the favorable features of the connector of the co-pending application. However, the first fitting of the connector of the present invention has, for example, an L-shape, and does not include an integral hexagonal shoulder, as was the case of the first fitting of the co-pending application. Instead, a ramp is formed on the first fitting adjacent to the threaded end thereof, and the Belleville washer of the assembly of the co-pending application is replaced by a resilient slotted collar which engages the ramp on the first fitting in locking relationship, as will be described.

BRIEF DESCRIPTION OF THE DRAWING

FIG. 3 is a exploded view showing the various components of the connector.

DETAILED DESCRIPTION OF THE ILLUSTRATED EMBODIMENT

Figure 1:
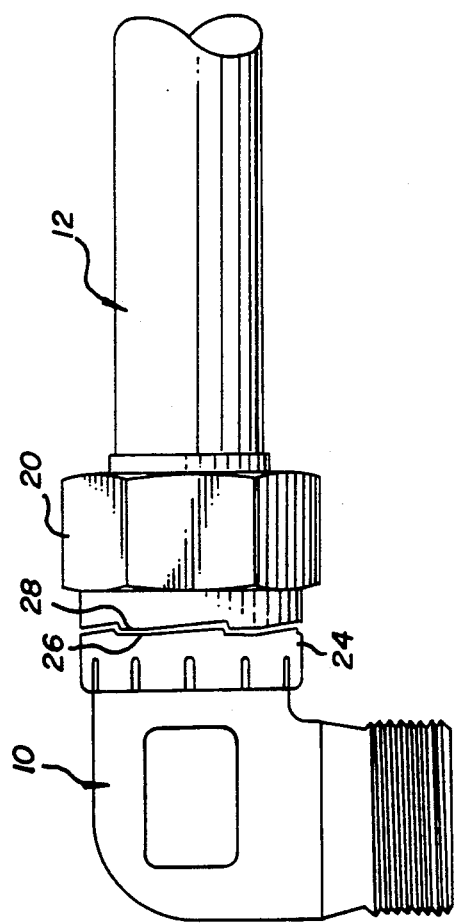
FIG. 1 is a side elevation of a connector constructed in accordance with the concepts of the invention.
Figure 2:
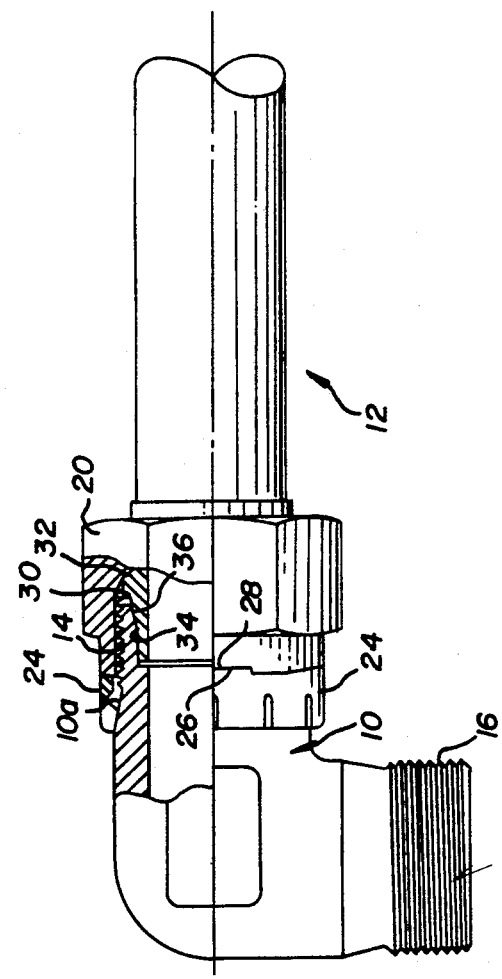
FIG. 2 is a view similar to the view of FIG. 1 but partially in section to reveal the relationship of certain internal components of the assembly.

The connector of the invention includes a first tubular fitting 10 and a second tubular fitting 12. Tubular fitting 10 has an L-shape, and has external threads on each end, designated 14 and 16. The fitting 10 also has an annular ramp 10(a) adjacent to the threads 14. A nut 20 is rotatably mounted on the second fitting 12, and the forward end of the nut 20 is threaded to the threads 14 of fitting 10. Nut 20 has an inner annular flange 32 at its rear end which engages an annular shoulder 30 on fitting 12 as nut 20 is threaded onto the threads 14 of fitting 10. A slotted resilient locking collar 24 is interposed between the nut 20 and ramp 10A. Locking collar 24 has a series of longitudinal slots extending inwardly from its forward end and positioned around the periphery of the collar. The forward end of slotted collar 24 resiliently engages ramp 10(a), and the collar locks against ramp 10(a) as nut 20 is tighten onto the threads 14 on the end of fitting 10. As nut 20 is tightened onto the threads 14, it draws the two fittings 10 and 12 together so that an annular sealing surface 36 on the second fitting 12 is drawn into sealing relationship with an annular seat 34 in the end of the first fitting 10.

The other end of collar 24 has a series of ramps 26 formed around its periphery, and the adjacent edge of nut 20 has a like series of ramps 28. The ramps 26 and 28 mate with one another when the nut 20 is tighten onto the threads 14 of the first fitting 10. The angle inclination of each ramp 26 and 28 is made greater than the helical pitch of the external threads 14 and the internal threads of nut 20, so that the ramps prevent relative rotation of the nut 20 and fitting 10 so as to enhance the locking characteristics of collar 24.

The invention provides, therefore, an improved connector which is simple in its construction, and yet which is sturdy and reliable in its operation.

It will be appreciated that while a particular embodiment of the invention has been shown and described, modifications may be made. It is intended in the claims to cover all modifications which come within the true spirit and scope of the invention.

I claim:

1. A self-locking connector comprising:
   first and second tubular fittings, said first fitting having a threaded end and further having an annular ramp formed adjacent to said threaded end and displaced inwardly from said threaded end, and said second fitting having an annular shoulder thereon adjacent to one end thereof; a nut rotatably mounted on said second fitting and having internal threads at its forward end adapted to be threaded to the threaded end of said first fitting, said nut having an inwardly extending annular flange at its rear end adapted to engage the shoulder on said second fitting to bring the two fittings into axially aligned mating and sealing relationship as the nut is tightened on the threaded end of said first fitting; an annular resilient collar co-axially mounted on said first fitting interposed between said annular ramp and said nut and surrounding said first fitting for axial movement with respect to said ramp, with the forward end of the collar moving axially with respect to said ramp and engaging the ramp in locking relationship therewith as the nut is tightened on to the threaded end of said first fitting.

2. The self-locking connector defined in claim 1, in which said collar has a plurality of longitudinal slots positioned around the periphery thereof at its forward end.

3. The self-locking connector defined in claim 1, which the adjacent edges of said nut and said collar have mating ramps formed thereon, each of said ramps having an angle greater than the helical angle of the threads of the threaded end of said first fitting and of said nut.

4. A self-locking connector defined in claim 3, in which the threaded end of said first fitting has an annular seat formed thereon, and the mating end of said second fitting has an annular sealing surface formed thereon to be received in said annular seat in sealing relationship therewith.

5. The self-locking connector defined in claim 1, in which said first fitting has an L-shaped, and in which the other end of said first fitting has a external threads formed thereon.

6. A self-locking connector comprising:
first and second tubular fittings, one end of said first fitting having external threads formed thereon of a selected helical angle and having an annular ramp formed thereon adjacent to said threads; a nut rotatably mounted on said second fitting and having internal threads of a corresponding helical angle adapted to be threaded to the threads of said first fitting to bring the two fittings into an axial aligned mating and sealing relationship as the nut is tightened on the first fitting; and a resilient collar coaxially mounted on said first fitting interposed between said nut and said annular ramp and surrounding said first fitting for axial movement with respect to said ramp, with the forward end of said collar moving axially with respect to said ramp and engaging said ramp in locking relationship therewith as the nut is tightened on to the threads on the end of said first fitting.

7. The self-locking connector defined in claim 6, in which the adjacent edges of said nut and said collar have mating ramps formed thereon, each such ramp having an angle greater than the helical angle of the threads of said first fitting and of said nut.

8. The self-locking connector defined in claim 6, which the threaded end of said first fitting has an annular seat formed thereon, and the mating end of said second fitting has an annular sealing surface formed thereon to be received in said annular seat in said first fitting in sealing relationship therewith.

9. The self-locking connector defined in claim 6, in which said collar has a plurality of longitudinal slots at the forward end thereof positioned around its periphery.

* * * * *